United States Patent
Koo et al.

(10) Patent No.: US 7,509,596 B2
(45) Date of Patent: Mar. 24, 2009

(54) POWER DISTRIBUTION NETWORK SIMULATION METHOD USING VARIABLE REDUCTION METHOD

(75) Inventors: Jong-Eun Koo, Gyeonggi-do (KR); Kyung-Ho Lee, Gyeonggi-do (KR); Young-Hoe Cheon, Gyeonggi-do (KR)

(73) Assignee: Samsung Electronics Co, Ltd., Suwon-si, Gyeonggi-do (KR)

( * ) Notice: Subject to any disclaimer, the term of this patent is extended or adjusted under 35 U.S.C. 154(b) by 477 days.

(21) Appl. No.: 11/056,955

(22) Filed: Feb. 11, 2005

(65) Prior Publication Data

US 2005/0203722 A1   Sep. 15, 2005

(30) Foreign Application Priority Data

Mar. 13, 2004 (KR) .................. 10-2004-0017162

(51) Int. Cl.
*G06F 17/50* (2006.01)

(52) U.S. Cl. ............... 716/2; 716/1; 716/4; 716/5; 716/6; 703/2; 703/14; 703/18

(58) Field of Classification Search ................ 716/1, 716/2, 4, 6, 11, 12; 703/2, 14, 18; 702/58, 702/136
See application file for complete search history.

(56) References Cited

U.S. PATENT DOCUMENTS

| | | | | |
|---|---|---|---|---|
| 5,808,917 | A * | 9/1998 | Chatterjee et al. ............. | 716/1 |
| 6,029,117 | A * | 2/2000 | Devgan ....................... | 702/58 |
| 6,041,170 | A * | 3/2000 | Feldmann et al. ............. | 703/2 |
| 6,151,698 | A * | 11/2000 | Telichevesky et al. ......... | 716/1 |
| 6,209,122 | B1 * | 3/2001 | Jyu et al. ..................... | 716/6 |
| 6,308,304 | B1 | 10/2001 | Devgan et al. | |
| 6,311,147 | B1 * | 10/2001 | Tuan et al. ................... | 703/18 |
| 6,523,154 | B2 * | 2/2003 | Cohn et al. ................... | 716/6 |
| 6,530,065 | B1 * | 3/2003 | McDonald et al. ............ | 716/4 |
| 6,536,026 | B2 * | 3/2003 | Gullapalli ..................... | 716/6 |
| 6,631,502 | B2 | 10/2003 | Buffet et al. | |
| 6,662,149 | B1 * | 12/2003 | Devgan et al. ................ | 703/14 |
| 6,789,237 | B1 * | 9/2004 | Ismail .......................... | 716/4 |
| 6,807,520 | B1 * | 10/2004 | Zhou et al. ................... | 703/14 |
| 6,842,714 | B1 * | 1/2005 | Acar et al. ................... | 702/136 |

(Continued)

OTHER PUBLICATIONS

Heydari et al.; "Model reduction of variable-geometry interconnects using variational spectrally-weighted balanced truncation"; Nov. 4-8, 2001; Computer Aided Design, 2001. ICCAD 2001. IEEE/ACM International Conference on□□pp. 586-591.*

(Continued)

*Primary Examiner*—Helen Rossoshek
(74) *Attorney, Agent, or Firm*—Marger Johnson & McCollom, P.C.

(57) ABSTRACT

A power distribution network simulation method capable of speedily and accurately analyzing a large power distribution network. In the power distribution network simulation method, the large original circuit is reduced to a suitable size by using a variable reduction method, a solution of an equation of the reduced circuit is obtained, and a solution of an equation of the original circuit is restored based on the solution of the equation of the reduced circuit by using the variable reduction method. According to the power distribution network simulation method using the variable reduction method, it is possible to speedily and accurately analyze the large power distribution network.

18 Claims, 4 Drawing Sheets

U.S. PATENT DOCUMENTS

| | | | |
|---|---|---|---|
| 7,016,820 B2* | 3/2006 | Kimura et al. | 703/2 |
| 7,024,652 B1* | 4/2006 | McGaughy et al. | 716/12 |
| 7,058,916 B2* | 6/2006 | Phelps et al. | 716/11 |
| 2002/0199160 A1 | 12/2002 | Fujine | |
| 2003/0088393 A1 | 5/2003 | Leonhardt | |
| 2003/0093762 A1* | 5/2003 | Rietman et al. | 716/2 |
| 2005/0203722 A1* | 9/2005 | Koo et al. | 703/2 |
| 2006/0150129 A1* | 7/2006 | Chiu et al. | 716/4 |

OTHER PUBLICATIONS

Koo et al.; "A variable reduction technique for the analysis of ultra large-scale power distribution networks"; 2004; Quality Electronic Design, 2004. Proceedings. 5th International Symposium on; pp. 137-142.*

* cited by examiner

POWER DISTRIBUTION NETWORK SIMULATION METHOD USING VARIABLE REDUCTION METHOD

BACKGROUND OF THE INVENTION

This application claims the priority of Korean Patent Application No. 2004-0017162, filed on Mar. 13, 2004, in the Korean Intellectual Property Office, the disclosure of which is incorporated herein in its entirety by reference.

1. Field of the Invention

The present invention relates to a linear circuit simulation method, and more particularly, to a power distribution network simulation method using a variable reduction method.

2. Description of the Related Art

There have been proposed many simulation methods to analyze a power distribution network of a linear circuit, particularly, a semiconductor integrated circuit. One of the conventional methods is disclosed in US Patent Laid-open No. US2002/0199160 A1. The conventional method has a limitation in simulating a large circuit including tens of millions of nodes and resisters. However, it is difficult to overcome the limitation.

Recently, IBM and Motorola have proposed a multi-grid method and a hierarchical method, respectively. However, both of the methods still have a problem in that there are errors beyond allowable tolerance when both of the methods are applied to a large circuit including tens of millions of nodes and resistors.

SUMMARY OF THE INVENTION

Embodiments of the invention provide a power distribution network simulation method having a high performance without any errors except for a round-off error associated with computer calculation.

According to an embodiment of the invention, a power distribution network simulation method comprises: reducing an original circuit by using a variable reduction method; analyzing the reduced circuit by using a linear equation analysis method; and restoring states of nodes of the original circuit by using the variable reduction method based on a result of the analysis.

The reducing an original circuit may comprise: dividing nodes of the original circuit into eliminated nodes and maintained nodes; generating a reduction operator in a form of a matrix; and reducing the original circuit with a linear transformation using the reduction operator.

All the nodes connected to the eliminated nodes may be set to the maintained nodes. A node connected to a smaller number of nodes may be set to the eliminated node. A node connected to more than a threshold number of nodes may be set to the maintained node.

A number of rows of the reduction operator may be equal to the number of nodes of the reduced circuit, and a number of columns of the reduction operator may be equal to the number of nodes of the original circuit. The reduction operator may be constructed with a combination of a unit matrix and eliminated-node distribution vectors, where the unit matrix has a size corresponding to the number of nodes of the reduced circuit.

The number of the nodes of the reduced circuit may be equal to the number of the maintained nodes. The eliminated-node distribution vectors may be used to distribute resistors or current sources connected to the eliminated nodes to the maintained nodes. Each of the eliminated-node distribution vectors may be associated with conductance values between the eliminated node and the maintained nodes divided by a sum of all the conductance values connected to the eliminated nodes.

The restoring states of nodes of the original circuit may comprise: calculating voltages of the maintained nodes of the reduced circuit; generating a restoring operator; and restoring voltages of the eliminated nodes by using the reduction operator and the restoring operator.

The restoring operator may be constructed with vectors having a size corresponding to the number of the nodes of the original circuit. Components of the restoring operator corresponding to the maintained nodes may have a value of 0, and components of the restoring operator corresponding to the eliminated nodes may have values obtained by dividing values of current sources connected to the eliminated nodes by the sum of values of all conductances connected to the eliminated nodes.

BRIEF DESCRIPTION OF THE DRAWINGS

The above and other features and advantages of the present invention will become more apparent by describing in detail exemplary embodiments thereof with reference to the attached drawings.

DETAILED DESCRIPTION OF THE PREFERRED EMBODIMENTS

Figure 1:
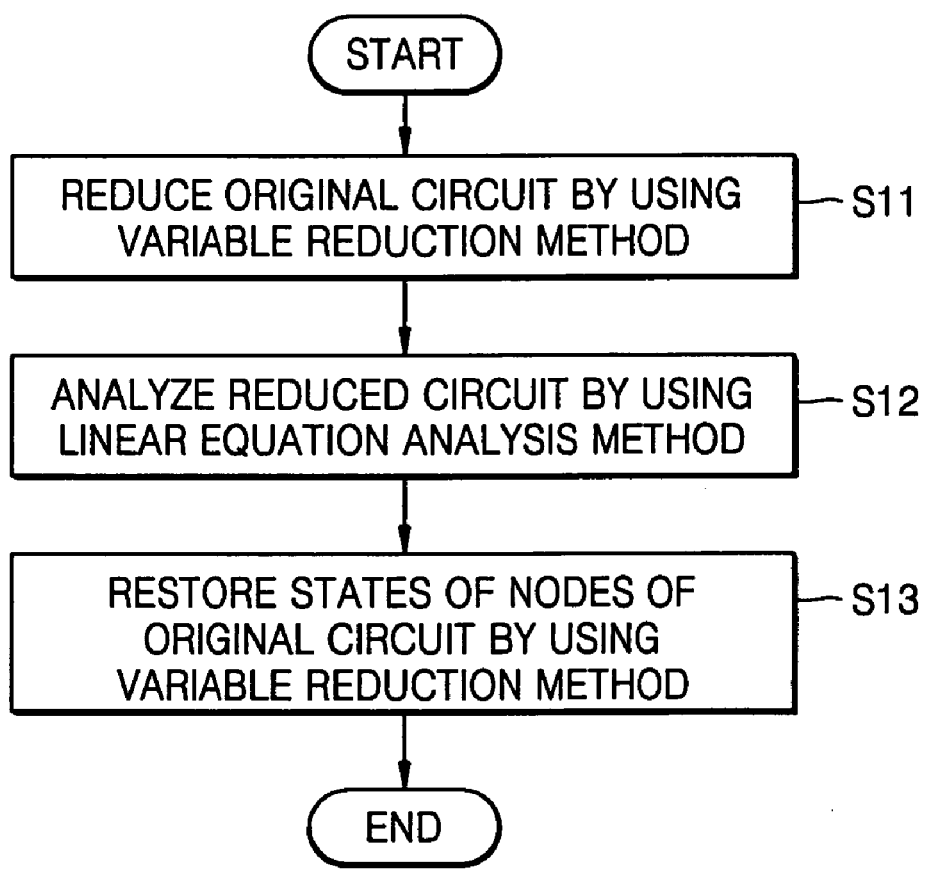
FIG. 1 is a flowchart showing a power distribution network simulation method according to the invention.

The invention and its operational advantages can be fully understood by referring to the accompanying drawings and explanations thereof.

Exemplary embodiments of the invention will be described with reference to the accompanying drawings to explain the invention in detail. In the drawings, the same reference numerals indicate the same elements.

FIG. 1 is a flowchart showing a power distribution network simulation method according to an embodiment of the invention. The power distribution network simulation method comprises a circuit reduction operation S11, a reduced circuit analysis operation S12, and an original circuit node state restoring operation S13.

In the circuit reduction operation S11, a large original circuit is reduced by using a variable reduction method, which is one of linear equation calculation methods. In the reduced circuit analysis operation S12, the reduced circuit is analyzed by using a linear equation analysis method. In the original circuit node state restoring operation S13, states of nodes of the original circuit are restored by using a variable reduction method from the results of the analysis.

More specifically, in the power distribution network simulation method according to the invention, the large original circuit is reduced in a suitable size, a solution of an equation of the reduced circuit is obtained, and a solution of an equation of the original circuit is restored based on the solution of the equation of the reduced circuit. In the circuit reduction operation S11 and the original circuit node state restoring operation S13, the variable reduction method is used to solve three-variable linear simultaneous equations.

Now, a process for solving the three-variable linear simultaneous equations represented by Equation 1 will be described.

$$a11x1+a12x2+a13x3=b1 \quad (1)$$ [Equation 1]

$$a21x1+a22x2+a23x3=b2 \quad (2)$$

$$a31x1+a32x2+a33x3=b3 \quad (3)$$

The three-variable linear simultaneous equations represented by Equation 1 can be represented in a form of matrix equation as follows.

$$\begin{bmatrix} a11 & a12 & a13 \\ a21 & a22 & a23 \\ a31 & a32 & a33 \end{bmatrix} \begin{bmatrix} x1 \\ x2 \\ x3 \end{bmatrix} = \begin{bmatrix} b1 \\ b2 \\ b3 \end{bmatrix}$$ [Equation 2]

From (2) of Equation 1, x2 is represented as follows.

$$x2=(1/a22)b2-(a21/a22)x1-(a23/a22)x3$$ [Equation 3]

By substituting Equation 3 into (1) and (3) of Equation 1, Equation 4 is obtained.

$$\begin{bmatrix} a11' & a12' \\ a31' & a33' \end{bmatrix} \begin{bmatrix} x1 \\ x3 \end{bmatrix} = \begin{bmatrix} b1' \\ b3' \end{bmatrix}$$ [Equation 4]

By solving Equation 4 with respect to x1 and x3, Equation 5 is obtained as follows.

$$\begin{bmatrix} x1 \\ x3 \end{bmatrix} = \begin{bmatrix} \ldots \\ \ldots \end{bmatrix}$$ [Equation 5]

By substituting Equation 5 into Equation 3, a solution represented by Equation 6 is obtained as follows.

$$\begin{bmatrix} x1 \\ x2 \\ x3 \end{bmatrix} = \begin{bmatrix} \ldots \\ \ldots \\ \ldots \end{bmatrix}$$ [Equation 6]

By applying the variable reduction method, the second node is eliminated from the three nodes of the original circuit (a linear circuit) so that the original circuit can be reduced into anther linear circuit having two nodes. Next, voltages of the first and third nodes are obtained, and the voltage of the eliminated second node is obtained (restored) based on the voltages of the first and third nodes. As a result, all the voltages of the three nodes of the original circuit are obtained so that the original circuit can be restored.

Figure 2:
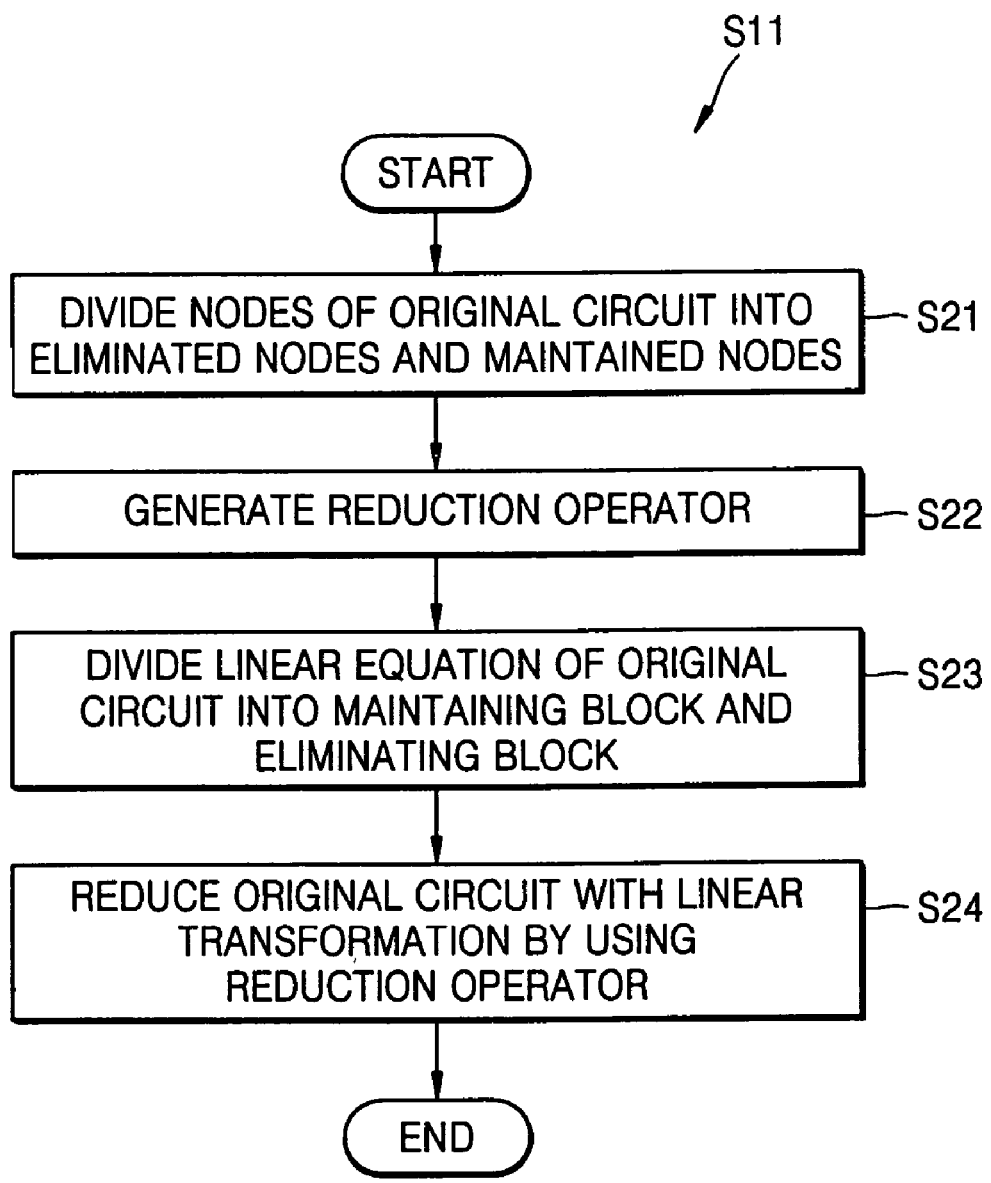
FIG. 2 is a flowchart showing an original circuit reduction operation S11 of FIG. 1.

FIG. 2 is a flowchart showing a circuit reduction operation S11 of reducing the original circuit of FIG. 1.

The circuit reduction operation S11 comprises: a node selection operation S21 of dividing nodes of the original circuit into eliminated nodes and maintained nodes; a reduction operator generation operation S22 of generating a reduction operator in a form of matrix; an linear equation dividing operation S23 of dividing a linear equation for the original circuit into an eliminated block and a maintaining block; and a original circuit reduction operation S24 of reducing the original circuit with a linear transformation using the reduction operator.

The node selection operation S21 is performed in order to increase efficiency of the node elimination. As a result, a maximum number of nodes can be eliminated in an allowable limit that still allows the eliminated nodes to be restored. In particular, three rules are set for the node selection operation S21. The first rule is that all the nodes connected to the eliminated nodes are set to the maintained nodes. The second rule is that a node connected to a smaller number of nodes is set to the eliminated node. The third rule is that a node connected to more than a threshold number of nodes is set to the maintained node.

The object of the first rule is to restore the voltage of the eliminated node from the voltages of the maintained nodes obtained from the reduced circuit. The object of the second rule is to increase the number of the eliminated nodes within an allowable limit. The object of the third rule is to decrease the complexity involved in the elimination of the nodes connected to too many other nodes.

Since the maintained nodes and the eliminated nodes are set by using the variable reduction method, it is possible to increase the efficiency of the node elimination and decrease the associated calculation time. In addition, it is possible to accurately calculate the voltages of the maintained nodes and restore the voltages of the eliminated nodes.

Figure 3:
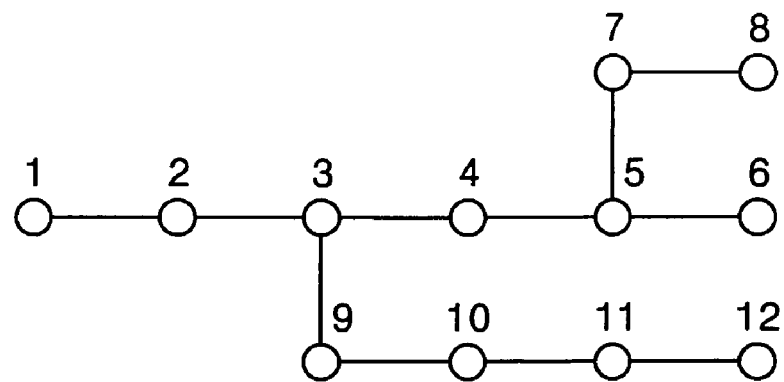
FIG. 3 is an example circuit for explaining three rules applied to a node selection operation S21 of FIG. 2.

FIG. 3 is a view showing an example circuit in order to explain a process, in which the three rules are applied in the node selection operation S21 of FIG. 2. The example circuit includes 12 nodes N1 to N12. Resistors (not shown) are connected between some nodes. A resistor (not shown) connecting with ground and an independent current source (not shown) are connected to each of the 12 nodes. The node selection rules are represented in Table 1.

TABLE 1

| | Node | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Number of Connected Nodes | 1 | 2 | 3 | 2 | 3 | 1 | 2 | 1 | 2 | 2 | 2 | 1 |
| Search Order | 1 | 5 | 11 | 6 | 12 | 2 | 7 | 3 | 8 | 9 | 10 | 4 |
| Eliminated (E)/ Maintained (M) | E | M | M | E | M | E | M | E | E | M | M | E |
| Others | | 1 | 2, 4, 9 | | 6, 4 | | 8 | | | 9 | 12 | |

Figure 4:
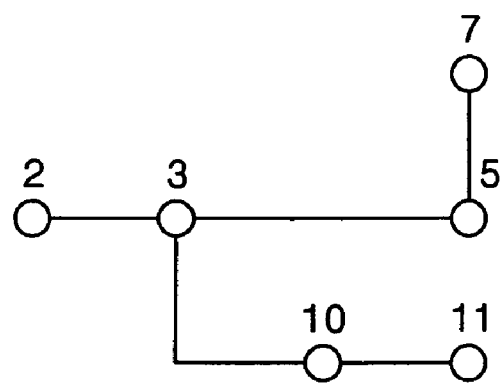
FIG. 4 is a view showing a reduced circuit of the example circuit of FIG. 3.

The search order shown in Table 1 is used to determine whether or not a node is eliminated in accordance with the second rule. The item "others" illustrates which eliminated nodes are used to set a given node to the maintained node in accordance with the first rule. In the embodiment, there are six eliminated nodes set in accordance with the three rules in the node selection operation S21. The resulting reduced circuit is shown in FIG. 4.

As described above, after the node selection operation S21, a reduction operator is generated in a form of matrix (S22). The reduction operation for the example circuit shown in FIG. 3 is represented by Equation 7.

$$R = \begin{bmatrix} * & 1 & 0 & 0 & 0 & 0 & 0 & 0 & 0 & 0 & 0 \\ 0 & 0 & 1 & * & 0 & 0 & 0 & 0 & * & 0 & 0 & 0 \\ 0 & 0 & 0 & * & 1 & * & 0 & 0 & 0 & 0 & 0 \\ 0 & 0 & 0 & 0 & 0 & 0 & 1 & * & 0 & 0 & 0 & 0 \\ 0 & 0 & 0 & 0 & 0 & 0 & 0 & 0 & * & 1 & 0 & 0 \\ 0 & 0 & 0 & 0 & 0 & 0 & 0 & 0 & 0 & 1 & * \end{bmatrix}$$ [Equation 7]

The reduction operator is constructed with a combination of a unit matrix and eliminated-node distribution vectors. The number of rows of the reduction operator is equal to the number of nodes of the reduced circuit, and the number of columns of the reduction operator is equal to the number of nodes of the original circuit. In addition, the number of the nodes of the reduced circuit is equal to the number of the maintained nodes.

The eliminated-node distribution vectors are used to distribute resistors or current sources connected to the eliminated nodes to the maintained nodes. Each of the eliminated-node distribution vectors is associated with conductance values between the eliminated node and the maintained nodes divided by a sum of all the conductance values connected to the eliminated nodes. The eliminated-node distribution vectors are also used to restore the voltage of the eliminated nodes.

After the reduction operator is obtained in operation S22, in operation S23, the linear equation of the original circuit is divided into a maintaining block and an eliminating block. In general, the linear equation of the original circuit can be represented by Equation 8 in a form of matrix equation. In this case, the divided linear equation is represented by Equation 9.

$$Ax = b$$ [Equation 8]

$$\begin{bmatrix} A_M & a \\ a^T & A_E \end{bmatrix} \begin{bmatrix} x_M \\ x_E \end{bmatrix} = \begin{bmatrix} b_M \\ b_E \end{bmatrix}$$ [Equation 9]

Here, the subscripts M and E denote maintaining and eliminating, respectively.

In operation S24, the original circuit is reduced with a linear transformation using the reduction operator. The linear transformation is represented by Equation 10.

$$R * \begin{bmatrix} A_M \\ a^T \end{bmatrix} * x_M = R * b_M$$ [Equation 10]

Here, R is the reduction operator. On the other hand, the linear equation representing the original circuit can be derived by using a general numerical analysis method such as a modified nodal analysis (MNA) formulation and a backward Euler's numerical integration.

After the original circuit is reduced by the process of the flowchart in FIG. 2, the reduced circuit is analyzed by using the linear equation analysis method. The linear equation representing the reduced circuit can be derived by using various linear equation analysis methods. As a well-known method, there is a Cholesky's factorization method using symmetric and positive definite characteristics of a coefficient matrix and a preconditioned conjugate gradient technique.

After the reduced circuit is analyzed, states of nodes of the original circuit are restored based on the results of the analysis by using the variable reduction method.

Figure 5:
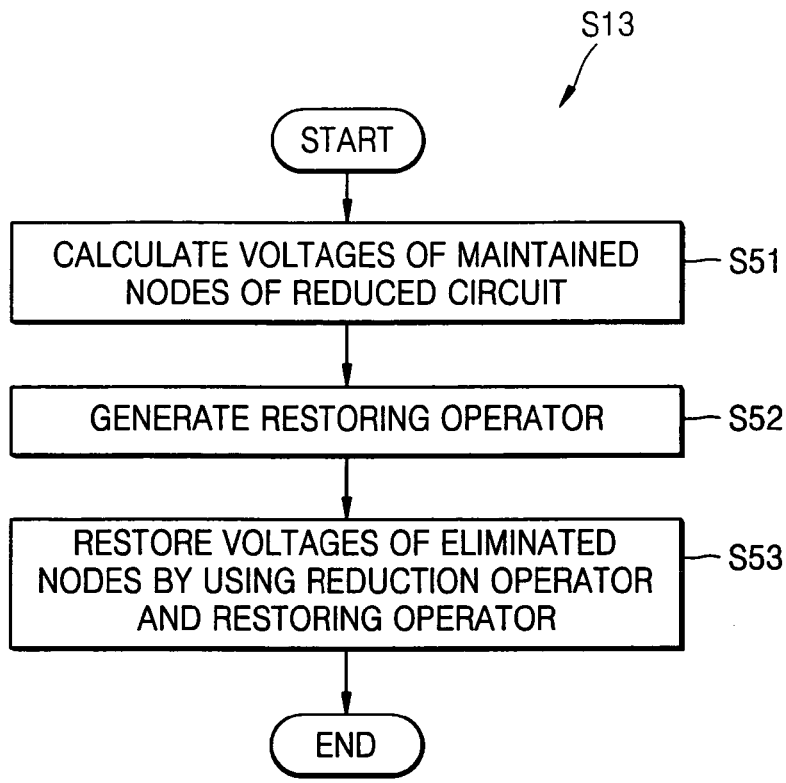
FIG. 5 is a view showing an original circuit state node restoring operation S13 of FIG. 1.

FIG. 5 is a view showing an original circuit node state restoring operation S13 of FIG. 1.

The original circuit node state restoring operation S13 comprises: operation S51 of calculating voltages of the maintained nodes of the reduced circuit; operation S52 of generating a restoring operator; and operation S53 of restoring voltages of the eliminated nodes by using the reduction operator and the restoring operator.

The restoring operator used for the example circuit shown in FIG. 3 is represented by Equation 11.

$$C^T = [* 0 0 * 0 * 0 * * 0 0 *]$$ [Equation 11]

The restoring operator is constructed with vectors having a size corresponding to the number of the nodes of the original circuit. Components of the restoring operator corresponding to the maintained nodes have a value of 0, and components of the restoring operator corresponding to the eliminated nodes are conductance values between the eliminated node and the maintained nodes divided by a sum of all the conductance values connected to the eliminated nodes.

The restoring operation S53 is performed by a linear transformation represented by Equation 12.

$$x_O = R^T * x_M + C$$ [Equation 12]

Here, the subscript O denotes the original circuit.

Here, R is the reduction operator and C is the restoring operator. The reduction operator and the restoring operator can be obtained from the conductance values connected to each other in the circuit and the current sources.

Figure 6:
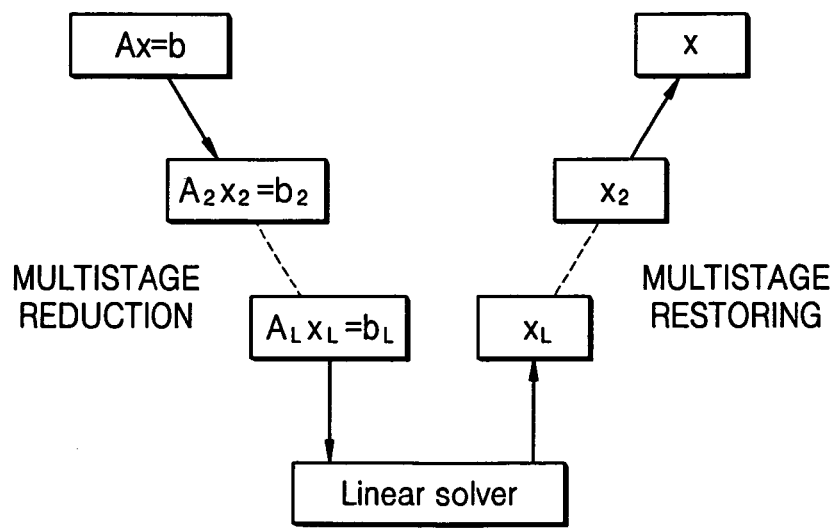
FIG. 6 is a view showing overall processes of repetitively performing reduction and restoring operations.

In a power distribution network simulation method according to an alternative embodiment of the invention, the circuit reduction operation S11 and the original circuit node state restoring operation S13 can be repetitively performed. As a result, it is possible to further increase the efficiency of the circuit elimination, that is, the circuit reduction. In addition, the circuit node state restoring operation S13 can be repetitively performed. The overall processes of repetitively performing the reduction operation S11 and restoring operation S13 are shown in FIG. 6.

In an equivalent model of power distribution network used for a semiconductor integrated circuit, there are many circuit devices including passive devices such as resistors and capacitors and active devices such as voltage sources and current sources. According to the invention, since a power distribution network simulation method is performed by using a variable reduction method in consideration of influence of the active device, it is possible to speedily and accurately analyze a large power distribution network.

In the power distribution network simulation method, since the amount of the calculation can be decreased with a linear transformation using a reduction operator, it is possible to speedily reduce the circuit. In addition, it is possible to accurately restore the original circuit without any error of calculation by using a restoring operator.

While the invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A power distribution network simulation method comprising:
   (a) reducing an original circuit by using a variable reduction method;
   (b) analyzing the reduced circuit by using a linear equation analysis method; and
   (c) restoring states of nodes of the original circuit by using the variable reduction method based on the analysis,
   wherein (a) comprises:
      (a1) dividing nodes of the original circuit into eliminated nodes and maintained nodes;
      (a2) generating a reduction operator in a form of matrix; and
      (a3) reducing the original circuit with a linear transformation using the reduction operator,
   wherein (c) comprises:
      (c1) calculating voltages of the maintained nodes of the reduced circuit;
      (c2) generating a restoring operator; and
      (c3) restoring voltages of the eliminated nodes by using the reduction operator and the restoring operator, and
   wherein reducing the original circuit includes repetitively performing (a1), (a2), and (a3), and wherein restoring the states of nodes of the original circuit includes repetitively performing (c1), (c2), and (c3).

2. The power distribution network simulation method according to claim 1, wherein, in (a1), all the nodes connected to the eliminated nodes are set to the maintained nodes.

3. The power distribution network simulation method according to claim 1, wherein, in (a1), a node connected to a smaller number of nodes is set to the eliminated node.

4. The power distribution network simulation method according to claim 1, wherein, in (a1), a node connected to more than a threshold number of nodes is set to the maintained node.

5. The power distribution network simulation method according to claim 1, wherein a number of rows of the reduction operator is equal to a number of nodes of the reduced circuit, and a number of columns of the reduction operator is equal to a number of nodes of the original circuit.

6. The power distribution network simulation method according to claim 5, wherein the number of the nodes of the reduced circuit is equal to the number of the maintained nodes.

7. The power distribution network simulation method according to claim 1, wherein the reduction operator is constructed with a combination of a unit matrix and eliminated-node distribution vectors, wherein the unit matrix has a size corresponding to the number of nodes of the reduced circuit.

8. The power distribution network simulation method according to claim 7, wherein the eliminated-node distribution vectors are used to distribute resistors or current sources connected to the eliminated nodes to the maintained nodes.

9. The power distribution network simulation method according to claim 1, wherein the restoring operator is constructed with vectors having a size corresponding to the number of the nodes of the original circuit.

10. A power distribution network simulation method comprising:
    (a) reducing an original circuit by using a variable reduction method;
    (b) analyzing the reduced circuit by using a linear equation analysis method; and
    (c) restoring states of nodes of the original circuit by using the variable reduction method based on the analysis,
    wherein (a) comprises:
       (a1) dividing nodes of the original circuit into eliminated nodes and maintained nodes;
       (a2) generating a reduction operator in a form of matrix; and
       (a3) reducing the original circuit with a linear transformation using the reduction operator,
    wherein the reduction operator is constructed with a combination of a unit matrix and eliminated-node distribution vectors, and the unit matrix has a size corresponding to the number of nodes of the reduced circuit,
    wherein the eliminated-node distribution vectors are used to distribute resistors or current sources connected to the eliminated nodes to the maintained nodes, and
    wherein each of the eliminated-node distribution vectors is associated with conductance values between the eliminated nodes and the maintained nodes divided by a sum of all the conductance values connected to the eliminated nodes.

11. A power distribution network simulation method comprising:
    (a) reducing an original circuit by using a variable reduction method;
    (b) analyzing the reduced circuit by using a linear equation analysis method; and
    (c) restoring states of nodes of the original circuit by using the variable reduction method based on the analysis,
    wherein (a) comprises:
       (a1) dividing nodes of the original circuit into eliminated nodes and maintained nodes;
       (a2) generating a reduction operator in a form of matrix; and
       (a3) reducing the original circuit with a linear transformation using the reduction operator,
    wherein (c) comprises:
       (c1) calculating voltages of the maintained nodes of the reduced circuit;
       (c2) generating a restoring operator; and
       (c3) restoring voltages of the eliminated nodes by using the reduction operator and the restoring operator,
    wherein the restoring operator is constructed with vectors having a size corresponding to the number of the nodes of the original circuit, and
    wherein components of the restoring operator corresponding to the maintained nodes have a value of 0, and components of the restoring operator corresponding to the eliminated nodes have values obtained by dividing values of current sources connected to the eliminated nodes by the sum of values of all conductances connected to the eliminated nodes.

12. A power distribution network simulation method comprising:
    (a) reducing an original circuit by using a variable reduction method;
    (b) analyzing the reduced circuit by using a linear equation analysis method; and
    (c) restoring states of nodes of the original circuit by using the variable reduction method based on the analysis,
    wherein (a) comprises:
       (a1) dividing nodes of the original circuit into eliminated nodes and maintained nodes;

(a2) generating a reduction operator in a form of matrix; and
(a3) reducing the original circuit with a linear transformation using the reduction operator, and
wherein (a) further comprise (a4) dividing a linear equation representing the original circuit into a maintaining block and an eliminating block after (a2),
wherein the linear equation of the original circuit has a form of Ax=b, and
wherein the divided linear equation has a form of:

$$\begin{bmatrix} A_M & a \\ a^T & A_E \end{bmatrix} \begin{bmatrix} x_M \\ x_E \end{bmatrix} = \begin{bmatrix} b_M \\ b_E \end{bmatrix}.$$

13. The power distribution network simulation method according to claim 12, wherein (a4) is performed by a linear transformation using:

$$R * \begin{bmatrix} A_M \\ a^T \end{bmatrix} * x_M = R * b_M,$$

wherein R is the reduction operator.

14. A power distribution network simulation method comprising:
(a) reducing an original circuit by using a variable reduction method;
(b) analyzing the reduced circuit by using a linear equation analysis method; and
(c) restoring states of nodes of the original circuit by using the variable reduction method based on the analysis,
wherein (a) comprises:
(a1) dividing nodes of the original circuit into eliminated nodes and maintained nodes;
(a2) generating a reduction operator in a form of matrix; and
(a3) reducing the original circuit with a linear transformation using the reduction operator,
wherein (c) comprises:
(c1) calculating voltages of the maintained nodes of the reduced circuit;
(c2) generating a restoring operator; and
(c3) restoring voltages of the eliminated nodes by using the reduction operator and the restoring operator, and
wherein (c3) is performed by a linear transformation using:

$$x_O = R^T * x_M + C,$$

wherein R is the reduction operator and C is the restoring operator.

15. A power distribution network simulation method comprising:
dividing nodes of an original circuit into eliminated nodes and maintained nodes;
generating a reduction operator constructed with a combination of a unit matrix and eliminated-node distribution vectors; and
reducing the original circuit with a linear transformation using the reduction operator,
wherein each of the eliminated-node distribution vectors is associated with conductance values between the eliminated nodes and the maintained nodes divided by a sum of all the conductance values connected to the eliminated nodes.

16. The power distribution network simulation method according to claim 15, wherein all the nodes connected to the eliminated nodes are set to the maintained nodes.

17. The power distribution network simulation method according to claim 15, wherein a node connected to a smaller number of nodes is set to the eliminated node.

18. The power distribution network simulation method according to claim 15, wherein a node connected to more than a threshold number of nodes is set to the maintained node.

* * * * *